(12) United States Patent
Bryll

(10) Patent No.: US 7,668,388 B2
(45) Date of Patent: Feb. 23, 2010

(54) SYSTEM AND METHOD FOR SINGLE IMAGE FOCUS ASSESSMENT

(75) Inventor: Robert K. Bryll, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 682 days.

(21) Appl. No.: 11/072,360

(22) Filed: Mar. 3, 2005

(65) Prior Publication Data

US 2006/0204121 A1    Sep. 14, 2006

(51) Int. Cl.
*G06K 9/40* (2006.01)
(52) U.S. Cl. ...................................... 382/255
(58) Field of Classification Search ......................... None
See application file for complete search history.

(56) References Cited

U.S. PATENT DOCUMENTS

| | | | | |
|---|---|---|---|---|
| 4,519,041 A * | 5/1985 | Fant et al. | .................... | 382/141 |
| 4,876,728 A * | 10/1989 | Roth | .......................... | 382/153 |
| 4,965,443 A | 10/1990 | Yamasaki et al. | | |
| 5,181,258 A * | 1/1993 | Nagao et al. | ................. | 382/206 |
| 5,227,830 A | 7/1993 | Yoshihara et al. | | |
| 5,291,563 A * | 3/1994 | Maeda | ........................ | 382/103 |
| 5,311,600 A * | 5/1994 | Aghajan et al. | ............. | 382/156 |
| 5,854,855 A * | 12/1998 | Errico et al. | ................. | 382/187 |
| 6,542,180 B1 | 4/2003 | Wasserman et al. | | |
| 6,597,381 B1 * | 7/2003 | Eskridge et al. | ............. | 715/804 |
| 6,753,919 B1 * | 6/2004 | Daugman | ................... | 348/345 |
| 6,987,876 B2 * | 1/2006 | Silber et al. | ................. | 382/152 |
| 2002/0172420 A1 * | 11/2002 | Nicolas | ....................... | 382/170 |
| 2003/0033436 A1 | 2/2003 | Weiss | | |
| 2003/0095710 A1 | 5/2003 | Tessadro | | |
| 2005/0109959 A1 | 5/2005 | Wasserman et al. | | |
| 2006/0153471 A1 * | 7/2006 | Lim et al. | .................... | 382/255 |

OTHER PUBLICATIONS

Bryll, Robert, et al., "Attribute Bagging: Improving Accuracy of Classifier Ensembles by Using Random Feature Subsets," *Pattern Recognition* 36:1291-1302, 2003.

Kautsky, J., et al., "A New Wavelet-Based Measure of Image Focus," *Pattern Recognition Letters* 23:1785-1794, 2002.

(Continued)

*Primary Examiner*—Bhavesh M Mehta
*Assistant Examiner*—Alex Liew
(74) *Attorney, Agent, or Firm*—Christensen O'Connor Johnson Kindness PLLC

(57) ABSTRACT

An image focus assessment method is provided that works reliably for images of a variety of relatively dissimilar workpieces or workpiece features. The focus assessment method is based on analysis of a single image (without the benefit of comparison to other images). The robustness of the focus assessment method is enhanced by the use of at least one classifier based on a plurality of focus classification features. In one application, a primary advantage of assessing focus from a single image is that an overall workpiece inspection time may be reduced by avoiding running an autofocus routine if an image is already in focus. In various embodiments, the focus assessment method may include an ensemble of classifiers. The ensemble of classifiers can be trained on different training data (sub)sets or different parameter (sub)sets, and their classification outcomes combined by a voting operation or the like, in order to enhance the overall accuracy and robustness of the focus assessment method.

17 Claims, 9 Drawing Sheets

OTHER PUBLICATIONS

*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7, 1st ed., Manual No. 99MCB225A, Series No. 359, Mitutoyo Corporation & Micro Encoder Inc., Kanagawa, Japan, Jan. 2003.

* cited by examiner

SYSTEM AND METHOD FOR SINGLE IMAGE FOCUS ASSESSMENT

FIELD OF THE INVENTION

The invention relates generally to methods for operating a machine vision inspection system with a camera and stage that are movable relative to one another in multiple directions so as to scan and inspect selected features of a workpiece on the stage, and more particularly to systems and methods that are able to evaluate the focus of an image that is being inspected.

BACKGROUND OF THE INVENTION

Precision machine vision inspection systems (or "vision systems" in short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools. One critical aspect is whether the acquired images are in focus.

Proper operation of a video tool depends on correct settings of various machine, image, and video tool parameters that affect the operation of the tool. For example, for an edge/boundary detection video tool to locate a target edge/boundary in an image, the image should be acquired with a correct level of focus, lighting/brightness, magnification, etc. In addition, the region of interest of a video tool (i.e., the region within a video image that the video tool searches) must be set so as to actually contain an edge/boundary workpiece feature to be detected.

Generally, the relevant machine and video tool parameters that govern acquiring an image of a workpiece feature and inspecting the feature are established and set under rather ideal conditions at the outset of defining and training a video tool, for example during a training mode of operation and programming. This is because, generally, an operator observes a real-time display of the workpiece feature and adjusts the relevant machine and video tool parameters, such as focusing, machine positioning, lighting, tool positioning and orientation, and other parameters until they are observed to be in a relatively ideal state for providing an accurate inspection result for the workpiece feature. However, during subsequent repeated automatic operation of the video tool in run mode, various unforeseen variations in part fabrication, part fixturing, vision machine degeneration, ambient lighting conditions, and the like, may contribute to a set of operating conditions that are not suitable for the proper operation of the video tool according to its previously established operating parameters. Thus, conventional video tools may fail to operate properly during "run mode" operations, for example, due to one or more unexpected variations in operating conditions or workpiece characteristics. Conventional video tools may also fail to operate properly during "learn mode" operations, because a relatively inexperienced user may be unable to set the relevant machine, image, or video tool parameters correctly, due to poor understanding of the operation of the tool and/or inexperience regarding its application.

One of the issues that may cause a video tool to fail to operate properly is when an image that is being inspected is out of focus. To improve upon an image that may be out of focus, the system may run an autofocus process. One drawback of the autofocus process is that it involves a relatively time consuming mechanical process consisting of acquiring a series of images at different camera-object distances, computing image characteristics indicative of the focus state (e.g. image contrast) for each acquired image, and finding the best focus position throughout the focus range of all the acquired images.

Therefore, a need exists for a system and method for assessing image focus from a single image. One use for such a system and method is that in various applications it allows processing time to be saved by avoiding running an autofocus process, if an image is already in focus.

SUMMARY OF THE INVENTION

It is known to quantify the degree of focus of an image based on any of a variety of contrast measures, or spatial frequency content measures, or the like. Typically, such measures are determined for various separate images of the same workpiece feature, each image corresponding to a different lens-workpiece distance to the workpiece feature, and then the measures are compared to determine which of the images exhibits the best focus. However, typically, a single quantitative metric is generally used, and the comparison of separate images of a consistent field of view is a crucial aspect of the operations. The comparison between images is crucial because the quantitative metric value to be expected for a focused image cannot generally be predicted in advance for non-specific or "uncontrolled" images, such as a "new" type of workpiece or a new type of workpiece feature, or the like. However, by comparing the same metric between images of the same workpiece feature taken at different lens-workpiece distances, the best value for the metric generally corresponds to an image with relatively good focus. In a special case, when imaging very similar, workpiece features under very consistent imaging conditions (such as lighting, exposure time, etc.) the metric for a current image can be compared to the quantitative value obtained for an image of a different (but very similar) workpiece feature taken at a previous time.

However, it should be appreciated that the previously known focus assessment methods described above are not appropriate for assessing the focus of an individual image, that includes a new or unique workpiece feature that may arise from a variety of relatively dissimilar workpieces or workpiece features. In contrast to the foregoing methods, according to the present invention, an image focus assessment method is provided that works reliably for a variety of relatively dissimilar workpieces or workpiece features, based on analysis of a single image (without the benefit of comparison to other images). The robustness of the assessment method is enhanced by the use of at least one classifier based on a plurality of focus indicating characteristics or classification features. The parameters or characteristics that are used by classifiers for classification are conventionally referred to as "features", and they are often included in a multiple-parameter "feature vector" that is input to the classifier. To avoid confusion between visible features in the image and the abstract features used by classifiers, herein we generally use the term "workpiece feature" to refer to a visible workpiece feature in an image, and the terms "classification features", or "feature vector", or "classification characteristic", or the like, to refer to aspects or parameters of an image that are used for classification. The aspects of the image used for classification are generally determined by computation or other types of analysis. If not specifically identified, the intended meaning of the terms "feature" or "characteristic" will be apparent from context.

In various exemplary embodiments of the invention, image focus is assessed from a single image. In accordance with one aspect of the invention, an image is analyzed and values are determined for at least one multi-dimensional (or multi-parameter) focus classification feature vector. A focus assessment method that includes at least one image focus classifier is then run. In one application of the invention, if the image focus assessment method indicates that the image is out of focus, then an autofocus process may be performed to provide an improved image. This invention can save processing time in such applications, by indicating or confirming whether an image is in focus, or out of focus, insuring that the relatively time-consuming mechanical autofocus process is performed only when it is necessary. This invention has particular utility in combination with the automatic video tool recovery methods of co-pending U.S. application Ser. No. 10/978,227, filed Oct. 29, 2004, which is incorporated herein by reference in its entirety.

In accordance with another aspect of the invention, at least one multi-parameter classifier is trained on examples of focused and defocused images that are classified as in-focus or out-of-focus by a user, in order to teach the classifier to similarly classify an image focus, based on extracted focus classification features. Various alternative types of pattern classifiers may be used (e.g., neural network, k-nearest neighbor rule (k-NNR) classifier, decision tree, fuzzy classifier, Bayesian classifier, etc.) In one embodiment, a back-propagation neural network classifier may be utilized to provide a straightforward, lightweight implementation. In particular, the back-propagation neural network classifier is easily trained by example, and offers a compact classifier representation that has relatively small storage or memory requirements and provides fast classification (due to its low computational requirements) once the network is trained. In an alternative embodiment, a k-NNR classifier may be used. A k-NNR classifier has the advantage that it is relatively simple to understand and easy to implement. However, since all training examples effectively become a part of the classifier (in the basic form of the k-NNR classifier) it also has the disadvantages that it has relatively large storage or memory requirements and has relatively computation-intensive recall (it is a memory-based or "lazy" classifier). In addition, because it typically employs a Euclidean distance metric based on an input vector having a relatively large number of dimensions, it is susceptible to errors due to noise in the inputs.

In accordance with another aspect of the invention, during a classification phase, for the image to be classified, its classification features are extracted or determined. In various embodiments, multiple focus classification features may be used. In various embodiments, the extracted classification features may include (but are not limited to) a contrast or contrast-range type of indicator, and/or an edge strength indicator, and/or an average image grayscale value, and/or one or more features of an image pixel intensity histogram. In accordance with one aspect of the invention, in some embodiments, the bins of an image pixel intensity histogram may be defined according to a prescribed structure or set of limits. In various embodiments, the input focus classification features may be normalized, so that the classifier (e.g. neural network classifier) is not dominated by classification features with idiosyncratically large numerical values. Then, the focus classification features are processed by the classifier (e.g., a trained neural network), which outputs the image focus classification (e.g., in some embodiments, a single continuous floating-point numerical output, which is interpreted as in-focus or out-of-focus depending on its value).

In accordance with another aspect of the invention, at least one set of training images is collected or defined, including focused and defocused images, and each image is labeled or characterized regarding its focus classification state, according to user desires or design criteria (e.g. the labels may be assigned manually by a user, and consist of a numerical classification value for each image, with one numerical value or range of values representing "in focus" and a different value, or range of values, representing "out of focus".) The assigned labels then become the desired classifier (e.g. neural network) outputs to be learned during a classifier training phase. During the training phase, the relevant focus classification features (that is, feature values or the like) are extracted or determined for each training image, to determine or generate a focus classification feature vector for each training image. The focus classification feature vector may include any classification features that are useful for classifying an image focus, for example, one or more features related to "contrast" or contrast-range, or the like (e.g. the grayscale variance of the image, or the like), and/or an average edge strength of the image measured as the average value of the image gradient for all pixels with gradient magnitude larger than a desired noise threshold, and/or the grayscale average intensity of the image, and/or one or more classification features of an image pixel intensity histogram, or the like. In accordance with one aspect of the invention, in some embodiments, the bins of an image pixel intensity histogram may be defined according to a prescribed structure or set of limits. As previously indicated, the classification feature values may be normalized to avoid domination of the classifier (e.g., neural network) inputs by classification features that typically have large nominal numerical values, while other classification features may typically have small nominal numerical values, prior to normalization. The classifier is then trained using any training method that is appropriate for that particular type of classifier. For example, in the case of a neural network classifier or the like, the classifier is then trained by repeatedly iterating through all of the training images (each training image being represented by its focus classification feature vector) and their manually assigned focus classification labels (which are typically, but not necessarily, numerical values). However, for some other types of classifiers, non-iterative training methods are appropriate. In any case, during the training phase, the classifier learns or determines the relationships between the extracted focus classification features and the manually assigned image focus classification labels, and generalizes these relationships, in order that they may be applied to properly classify later-acquired images that are to be evaluated.

In accordance with another aspect of the invention, in some embodiments or applications, the classifier (e.g., a neural network) may be customized to improve the classification performance for the images from particular types of inspection workpieces, or the like. In other words, while in some applications a generic classifier may be trained to provide reasonably accurate focus assessment for images obtained from a relatively large or "uncontrolled" variety of workpieces, in other applications a more specialized classifier may be customized and/or trained to classify images obtained from a relatively small or "controlled" variety of workpieces, or even a single type of workpiece. In such "restricted" applications where a classifier is not expected to be used for a large or uncontrolled variety of workpieces, such a specialized classifier can be faster and more accurate than a generically-trained classifier.

In accordance with another aspect of the invention, steps are taken to avoid over-training the classifier. In other words, if too many training iterations are run during the training phase of a neural network classifier, or the decision boundaries of a k-NNR classifier are not smooth enough, the classifier may become "over-trained", that is, too specifically adapted to the specific set of training images. In such a case, the classifier may actually become less robust, and less able to properly evaluate later-acquired images that may include image characteristics and/or workpiece features that vary from the nominal characteristics and/or workpiece features of the training set. For many types of classifiers, for example neural network classifiers, this can be avoided by manually or automatically monitoring a classification error value during the training process, and stopping the training process once the error value has reached a relatively low level and/or a level where additional iterations do not result in significant additional reductions in the error value. Alternatively, the error value reduction rate can be manually or automatically monitored, and when the rate is still significant, but drops below a desired threshold, the training can be terminated following a specific number of additional training iterations. In the case of a k-NNR type of classifier, over-training problems may be avoided by choosing relatively high values of k, which tends to provide smooth classification boundaries and a classifier that is not too specialized to a particular set of training images.

In accordance with another aspect of the invention, when an image pixel intensity histogram is utilized, the number of bins and/or their limits are selected so as to provide valuable information about the image pixel intensity distribution while also avoiding an excessive number of bins. An excessive number of bins may introduce irrelevant classifier inputs (which may be regarded as noise), which may decrease the classification performance. For example, in one embodiment where an image pixel intensity histogram provides one or more focus classification features, approximately six bins are used. However, this example is illustrative and not limiting. In various other embodiments, a somewhat fewer or greater number of bins may be used in accordance with the previously described principles.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
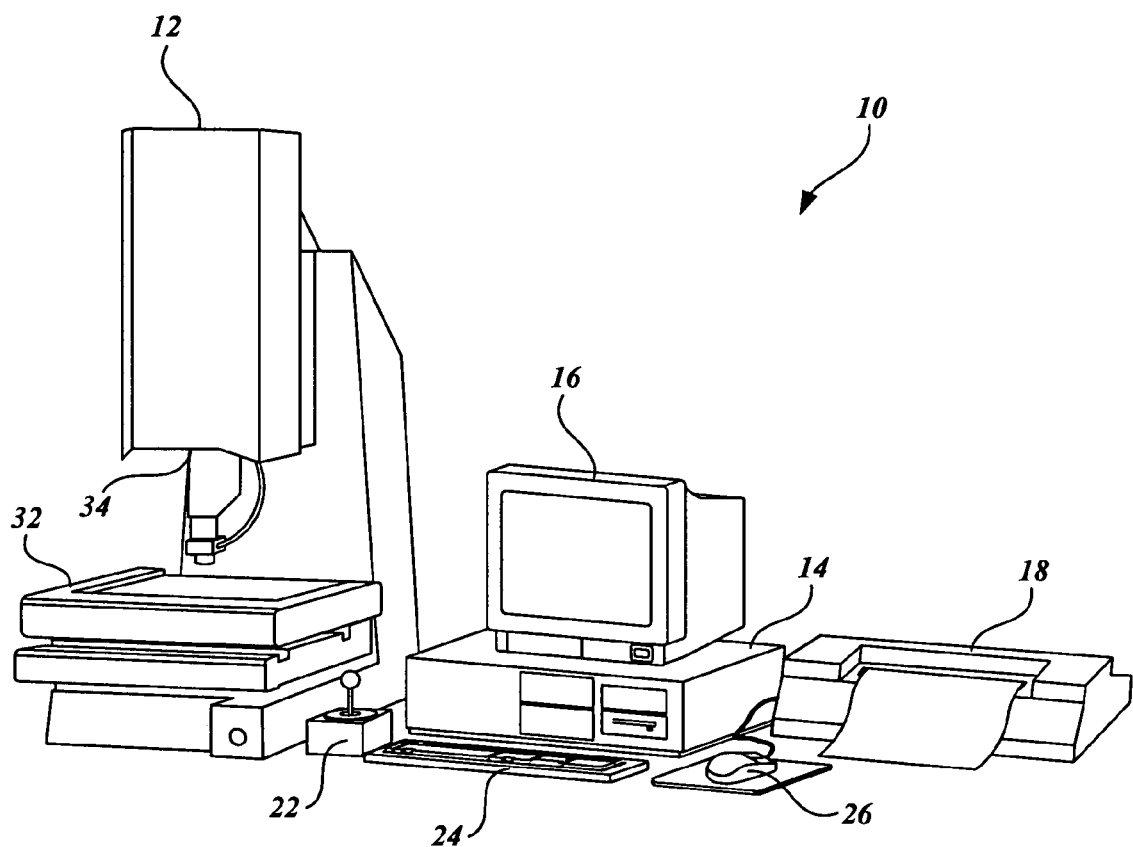
FIG. 1 is a diagram showing various typical components of a machine vision inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16, may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. In many applications, the images may include microscopic workpiece features, and exhibit both in-focus and out-of-focus portions due to the limited depth of field of the magnifying lenses in combination with the geometry of an imaged workpiece. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in the previously incorporated U.S. patent application Ser. No. 10/978,227.

Figure 2:
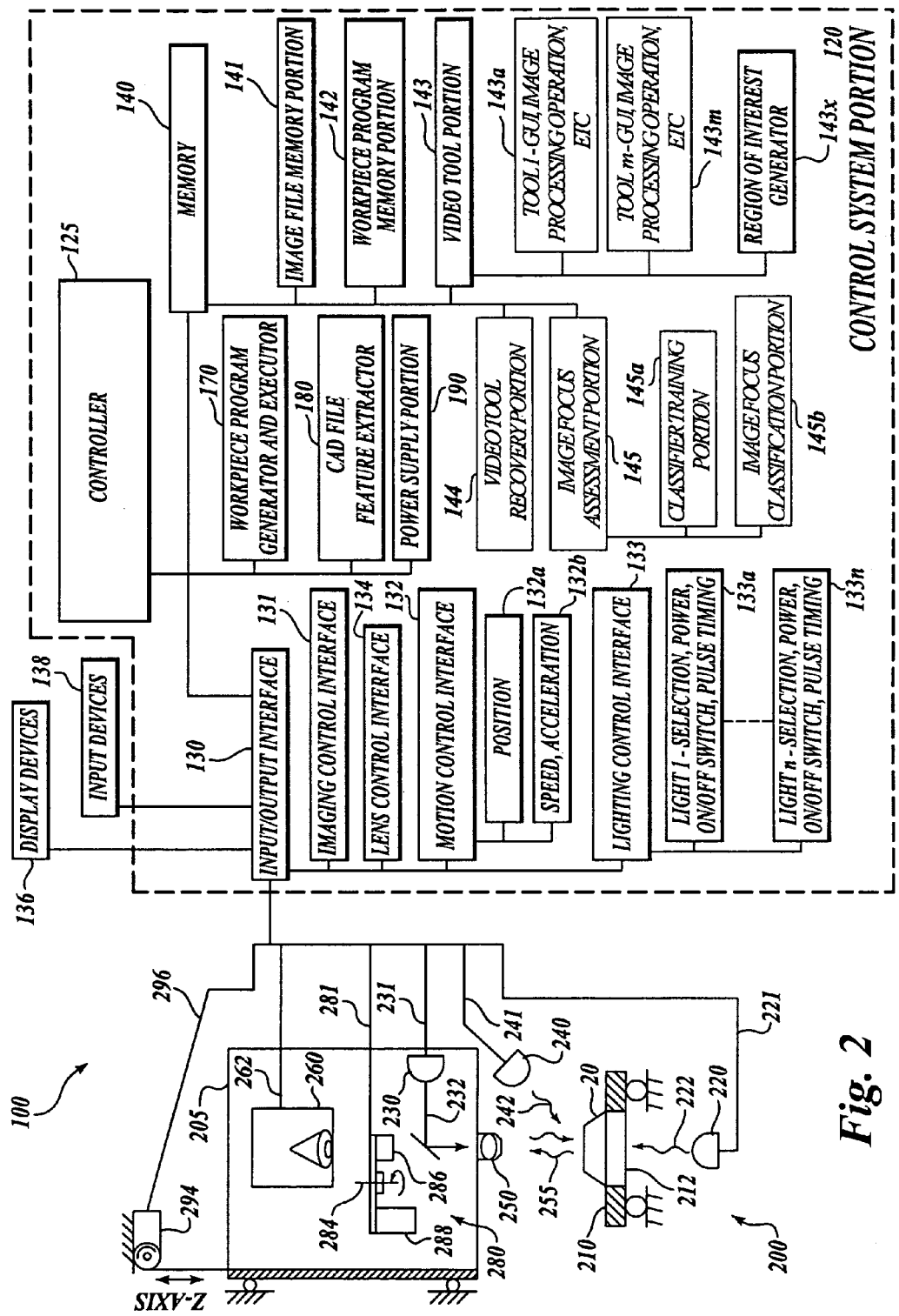
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231 and 241, respectively. As a primary optical assembly of the machine vision inspection system 100, the optical assembly portion 205 may include, in addition to the previously discussed components, other lenses, and other optical elements such as apertures, beam-splitters and the like, such as may be needed for providing coaxial illumination, or other desirable machine vision inspection system features. When it is included as a secondary optical assembly of the machine vision inspection system 100, the turret lens assembly 280 includes at least a first turret lens position and lens 286 and a second turret lens position and lens 288. The control system portion 120 rotates the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n, which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes tool portions 143a-143m, which determine the GUI, image processing operation, etc., for each of the corresponding tools. The video tool portion 143 also includes a region of interest generator 143x that supports automatic, semi-automatic and/or manual operations that define various regions of interest that are operable in various video tools included in the video tool portion 143. The memory 140 may also include a video tool recovery portion 144 and an image focus assessment portion 145. The video tool recovery portion 144 may comprise circuits, routines and/or applications usable to perform the operations described in the previously incorporated '227 application. The image focus assessment portion 145 may comprise a classifier training portion 145a and an image focus classification portion 145b that, respectively, include circuits, routines and/or applications usable to perform the various focus assessment training operations and focus classification operations disclosed herein. However, more generally, this invention may be implemented in any now known or later-developed form that is operable in conjunction with the machine vision inspection system 100, or the like.

In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130. The memory portion 140 also contains data defining a graphical user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs, to view the images captured by the camera system 260, and/or to directly control the vision system components portion 200. In a fully automated system having a predefined part program (or workpiece program), the display devices 136 and/or the input devices 138 may be omitted.

With regard to the CAD file feature extractor 180, information, such as a CAD file representing a workpiece is frequently available in industrial applications of machine vision inspection systems. The locations of edges and boundaries in the CAD file representation may be determined manually, in a semi-automated fashion, or fully automatically, in such information may be useful for workpiece programming or navigating to a desired workpiece feature.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired. In addition to the program instructions that control the relative movement of the camera and the workpiece, the workpiece image acquisition program also needs to include program instructions that activate one or more of the light sources 220-240 to provide a desired illumination of the workpiece 20 during each image acquisition.

Once a set of workpiece image acquisition instructions are defined, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These methods are typically embodied in various video tools included in the video tool portion 143 of the memory 140. Such tools may include, for example, edge/boundary detection tools (one example of which is disclosed in U.S. patent application Ser. No. 09/987,986, incorporated by reference herein), shape or pattern matching tools, dimension measuring tools, coordinate matching tools, autofocus tools, and the like. For example, such tools are routinely used in a variety of commercially available machine vision inspection systems, such as the QUICK VISION® series of vision systems and the associated QVPAK® software, discussed above. Autofocus tools, such as the surface focus tools and edge focus tools available in the QVPAK® software and other commercially available machine vision systems, may be run if an image is determined to be out of focus according to the principles of this invention. In addition, improved autofocus tools and methods may be used, such as those described in co-pending U.S. patent application Ser. No. 10/719,210, filed Nov. 24, 2003, which is incorporated herein by reference in its entirety.

Other tools available in QVPAK® software and the like include, for example, a Point tool, a Box tool, a Circle tool, and an Arc tool (see QVPAK 3D CNC Vision Measuring Machine User's Guide, incorporated by reference above). Each of these tools may be used to automatically detect a particular edge/boundary of a workpiece feature in an image.

After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140.

The ability to assess image focus from a single image can save processing time in various applications, by indicating or confirming whether an image is in focus, or out of focus, insuring that a relatively time-consuming mechanical autofocus process is performed only when it is necessary. As noted previously, this invention has particular utility in combination with the automatic video tool recovery methods of the previously incorporated '227 application, since incorrect image focus is one the most typical causes of video tool failure and therefore needs frequent assessment.

The single image focus assessment process is summarized briefly here, and will be described in more detail below with respect to FIGS. 3-9. In summary, to determine if an image is in or out of focus, an image focus classification routine may be run on the image. During the classification routine, a plurality of focus classification features are extracted or determined. The plurality of focus classification features are utilized by the classifier to assess whether the image is in focus. Examples of possible focus classification features may include contrast-related or contrast range type of indicator, an edge strength (or edge gradient) indicator, an average grayscale value, the characteristics of a multi-bin image pixel intensity histogram, etc. As previously indicated, classification feature values may be normalized to avoid domination of the classifier inputs by classification features that may typically have large nominal numerical values, while other classification features may typically have small nominal numerical values, prior to normalization. Once all the desired classification features are obtained for the image, they are processed by at least one classifier (e.g., a trained neural network), which outputs an image focus classification (e.g., a single continuous (floating point) numerical output that indicates whether the image is in or out of focus, depending on its value).

Figure 3:
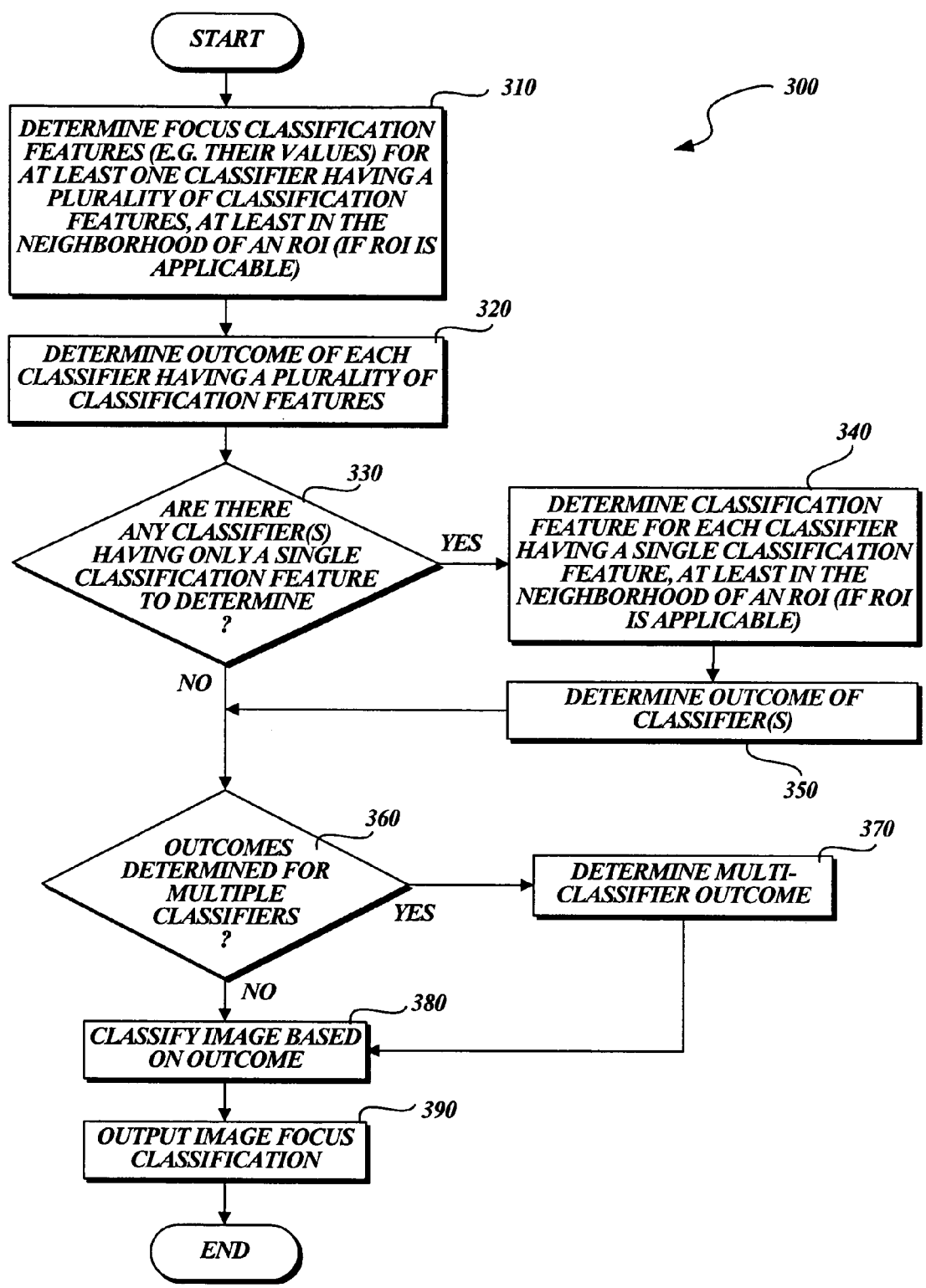
FIG. 3 is a flow diagram illustrative of one embodiment of a routine for a focus assessment method that classifies the focus of an image in accordance with the present invention.

FIG. 3 is a flow diagram illustrative of one embodiment of a routine 300 for a focus assessment method that classifies the focus of an image in accordance with the present invention. At a block 310, a respective plurality of focus classification features, that is, a plurality of feature values or the like, are determined or extracted from the image for at least one respective classifier. Using at least one classifier that is based on a plurality of classification features tends to increase the robustness of a focus assessment method that is expected to correctly classify a variety of workpiece images. In some cases, the classification features may be determined based on the entire image, in order to classify the entire image. However, in many cases, it is only important to assess the focus of an image in the neighborhood of a region of interest (ROI) associated with a video tool that is used to inspect a workpiece feature at that location. In such cases, to ensure that the video tool works properly, it is sufficient to determine the classification features based just on the neighborhood of the region of interest, for example, a neighborhood that nominally includes the entire region of interest as well as a buffer zone large enough to allow for the region of interest remaining in the analyzed neighborhood for all expected part fixturing and feature location tolerances, and the like.

At a block 320, the classification outcome is determined for each of the respective classifiers that had their respective plurality of focus classification features determined by the operations of block 310. At a decision block 330, if the focus assessment method includes one or more additional classifiers, that are based on a single classification feature, then operation continues at a block 340, otherwise, operation continues from block 330 to a decision block 360. At the block 340, a respective classification feature, that is, a feature value or the like, is determined or extracted from the image for each such classifier and at a block 350, the classification outcome is determined for each of the respective classifiers that had their respective focus classification feature determined by the operations of block 340. Operation then continues to the decision block 360. At the decision block 360, if the focus assessment method is an embodiment that includes determining (and later combining) the outcomes of a plurality of classifiers, then operation continues at a block 370, otherwise, operation continues from block 360 to a block 380.

At the block 370, the outcomes of the plurality of classifiers are combined to determine a final "multi-classifier" outcome for the image, and operation continues at the block 380. As one example, each classifier outcome may be a value that is numerically combined with the other classifier outcomes, to arrive at a multi-classifier numerical value that is indicative of an in-focus or out-of-focus image, depending on its value. As a second example, each individual classifier outcome may be converted to a "vote" that the image is either in-focus or out-of-focus, and the multi-classifier outcome may be determined as the focus state having the most votes. Focus assessment using multiple classifiers is discussed further below.

At the block 380, the image is classified based on the previously determined classifier outcome. If the focus assessment method is a multi-classifier method, then the image is classified based on the outcome determined by the operations of block 370. If the focus assessment method is a multi-parameter single-classifier method, then the image is classified based on the outcome determined by the operations of block 320. For example, if the previously determined classifier outcome is a numerical value, the numerical value may be compared to an "in-focus/out-of-focus" numerical threshold, and the image classified accordingly. Then, at a block 390, the image focus classification is output or stored, and the method ends. The focus classification output may be used by other operations of the machine vision system, for example, to govern whether a subsequent autofocus operation will be performed.

Figure 4:
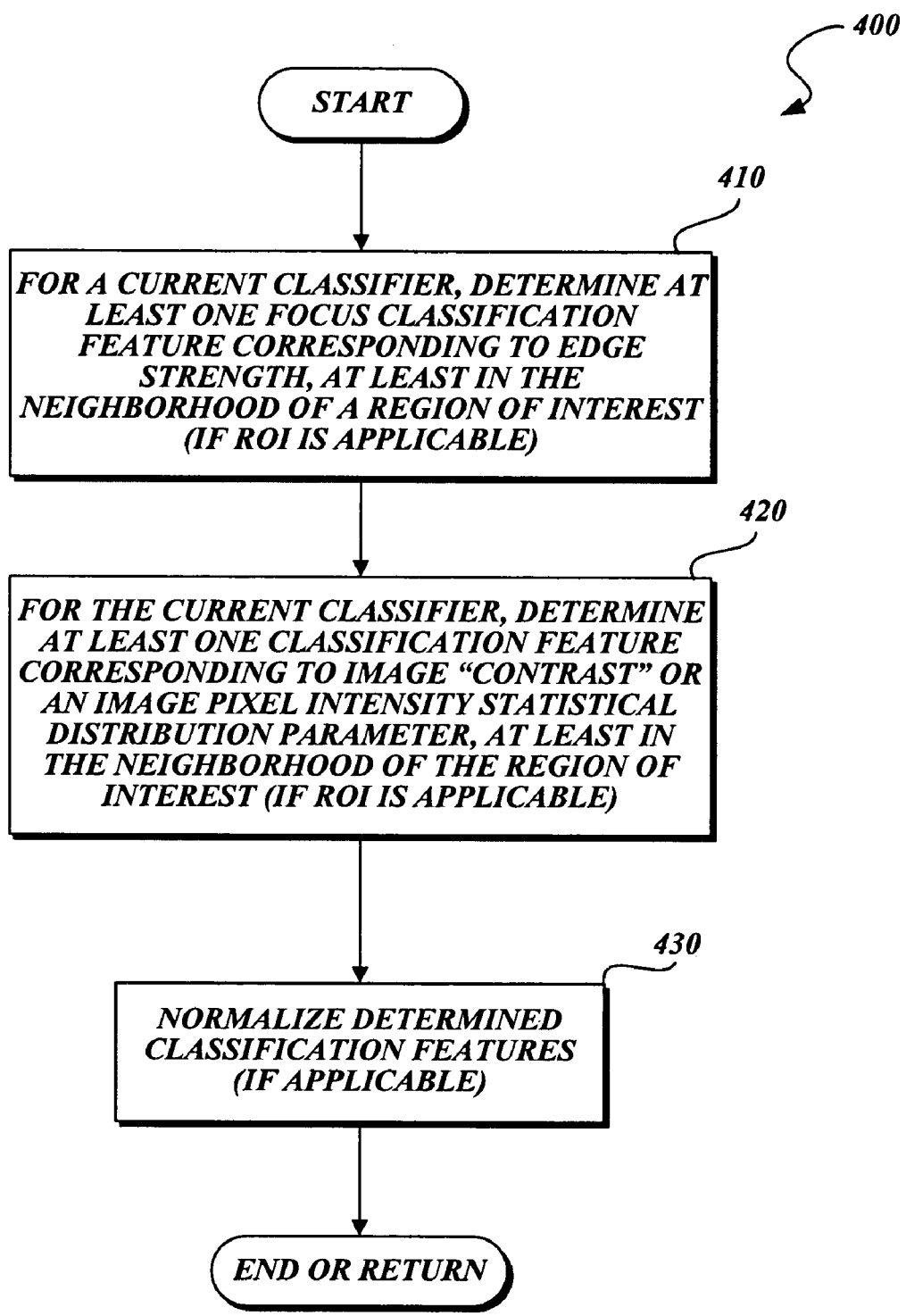
FIG. 4 is a flow diagram illustrative of a first exemplary embodiment of a routine for determining focus classification features for a multi-parameter classifier in accordance with the present invention.

FIG. 4 is a flow diagram illustrative of a first exemplary embodiment of a routine 400 for determining focus classification features for a multi-parameter classifier, such as one or more classifiers included in the operations of block 310 of the previously described focus assessment routine 300. However, with reference to the operations of block 310, the routine 400 is exemplary only, and not limiting.

Beginning at a block 410 for a current classifier, at least one focus classification feature corresponding to edge strength is determined, based at least on the neighborhood of a region of interest in the image to be assessed. Generally, edge strength may be indicated by the magnitude of one or more of various gradient measures. For example, one or more of the following gradient-sensitive metrics, averaged over the area analyzed, may be used.

$$M_A = \int\int \left|\frac{\partial g_i(x, y)}{\partial x}\right| + \left|\frac{\partial g_i(x, y)}{\partial y}\right| dx\, dy \quad (1)$$

$$M_B = \int\int \left(\frac{\partial g_i(x, y)}{\partial x}\right)^2 + \left(\frac{\partial g_i(x, y)}{\partial y}\right)^2 dx\, dy \quad (2)$$

$$M_C = \int\int \left|\frac{\partial^2 g_i(x, y)}{\partial x^2}\right| + \left|\frac{\partial g_i^2(x, y)}{\partial y^2}\right| dx\, dy \quad (3)$$

$$M_D = \int\int \left(\frac{\partial^2 g_i(x, y)}{\partial x^2} + \frac{\partial^2 g_i(x, y)}{\partial y^2}\right)^2 dx\, dy \quad (4)$$

where $g_i(x,y)$ is the image grayscale value (intensity) at an $(x,y)$ location. It will be recognized that the foregoing equations are generic or "theoretical" types of expressions. However, one of ordinary skill in the art may readily determine practical formulations corresponding to these equations, for example formulations that perform corresponding operations or analyses for local groups of neighboring pixels and sum the results of the analyses for all the local groups within a desired image area, or the like. For example, another gradient-sensitive metric that may be used, expressed here in a "practical formulation", is:

$$M_F = \sum_{i=1}^{n} ((A_i - B_i)^2 + (A_i - C_i)^2 + (D_i - B_i)^2 + (D_i - C_i)^2) \quad (5)$$

where $A_i$-$D_i$ are the gray levels or intensities for the ith group of four nearest-neighbor pixels, and the summation for n extends over the image area to be analyzed.

In addition, in various embodiments it is advantageous if a noise threshold is implemented with any of the foregoing edge strength metrics. That is, the gradient value at any pixel is included or accumulated in the metric only if it exceeds a threshold value that is related to a gradient value expected for "recognizable" edge images. However, the foregoing metrics are exemplary only, and not limiting. More generally, any suitable now-known or later-developed metric that is indicative of edge strength, e.g. high frequency Fourier or wavelet coefficients, may be used.

Next, at a block 420, for the current classifier, at least one focus classification feature that is contrast-related or contrast-range-related, or an image pixel intensity statistical distribution parameter, or the like, is determined based at least on the neighborhood of a region of interest in the image to be assessed. The term "contrast" is used herein in an informal sense, to refer generally to the intensity variation or intensity range included in a relevant portion of an image. The term "contrast" does not imply a formal or mathematical "image processing" type of definition, unless otherwise indicated by context. In contrast to the aforementioned edge strength indicators, contrast-related or contrast-range-related features or intensity statistical distribution parameter classification features, are chosen to be relatively insensitive to the spatial distribution and/or directionality associated with the pixel intensity variations in an image. Thus, such classification features will provide additional information about global (average) "contrast" and/or brightness of an image, that supplements the type of information provided by edge strength indicators and the like.

The global "contrast" or contrast-range of an image may be indicated by the magnitude of one or more of various measures. For example, the following metric, averaged over the area analyzed, may be used.

$$M_E = \int\int (g_i(x, y) - m_i)^2 dx dy \qquad (6)$$

where mi is the mean gray level of the analyzed image region. However, the foregoing metric is exemplary only, and not limiting. More generally, any suitable now-known or later-developed metric that is indicative of a global image "contrast" or contrast-range, or the like, may be used.

In place of, or in addition to, the foregoing "contrast" or contrast-range type metrics, one or more parameters related to an image pixel intensity statistical distribution may be determined at block 420. In one implementation, the average image pixel intensity is a statistical distribution parameter that may be used as a focus classification feature. For example, when one or more edge strength classification features are effective for classifying focus in application, the average image pixel intensity provides a useful supplemental classification feature, which tends to reject images as out-of-focus when an expected lighting condition causes a significantly over-exposed or under-exposed image, which is not suitable for analysis, or requires different decision boundaries for its extracted edge strength parameters. In another example, the image grayscale variance of EQUATION 6 provides useful additional information about how "faded" the analyzed image is. In some applications, a different focus classification may be desirable for images with similar edge strength parameters but a different amount of overall "fading" or "contrast". In another implementation, the image pixel intensity statistical distribution is represented by an intensity frequency histogram.

With regard to using an image pixel intensity histogram, it should be appreciated that in certain implementations, utilization of too many bins for the histogram may tend to introduce too many irrelevant inputs to the related classifier, which often decreases the performance of a classifier or makes it prone to over-fitting the training set of images. That is, the resulting classifier works very well for the training set of images, but tends to perform less well for new, more general, images be classified. In one implementation, utilization of six bins was found advantageous. However, more generally, approximately 4-12 bins may also have advantages in various applications. In one exemplary six-bin implementation, the histogram is normalized by the total number of pixels, and one bin is utilized for saturated pixels with a grayscale value equal to 255, while the remaining five bins may be evenly distributed from 0 to 255. In various embodiments, any or all of the bin frequencies are distribution parameters that may be used as a focus classification feature. In various other embodiments, ratios between various bin frequencies, or ratios between combinations of bin frequencies, or the like, are distribution parameters that may be used as a focus classification feature. However, the foregoing histogram distribution parameters are exemplary only, and not limiting, and other parameters may be derived from such a histogram and provide useful focus classification features.

Next, at a block 430, if the native value of one or more of the previously determined focus classification features is not suitable in comparison to the native values of other classification features used by the current classifier, then such classification features are normalized so as to avoid distortion of the desired operation of the classifier (e.g. a neural network) by classification features with idiosyncratically large or small numerical values, and the routine 400 ends.

As will be described in more detail below with reference to FIG. 5, at least one classifier, including at least one multi-feature classifier, is trained on examples of focused and defocused images that have been previously classified, for example by an expert user, in accordance with a desired classification outcome that, ideally, is to be matched by each trained classifier. Multiple types of classifiers may be utilized individually, or in combination (e.g., neural network, k-nearest neighbor rule classifier (k-NNR), decision tree, fuzzy classifier, Bayesian classifier, etc.) In one embodiment, at least one classifier is a back-propagation neural network type of classifier. Such a classifier provides easy training-by-example, and provides efficient implementation in terms of computation time and storage requirements, resulting in fast classification (fast recall) once the classifier is trained.

Figure 5:
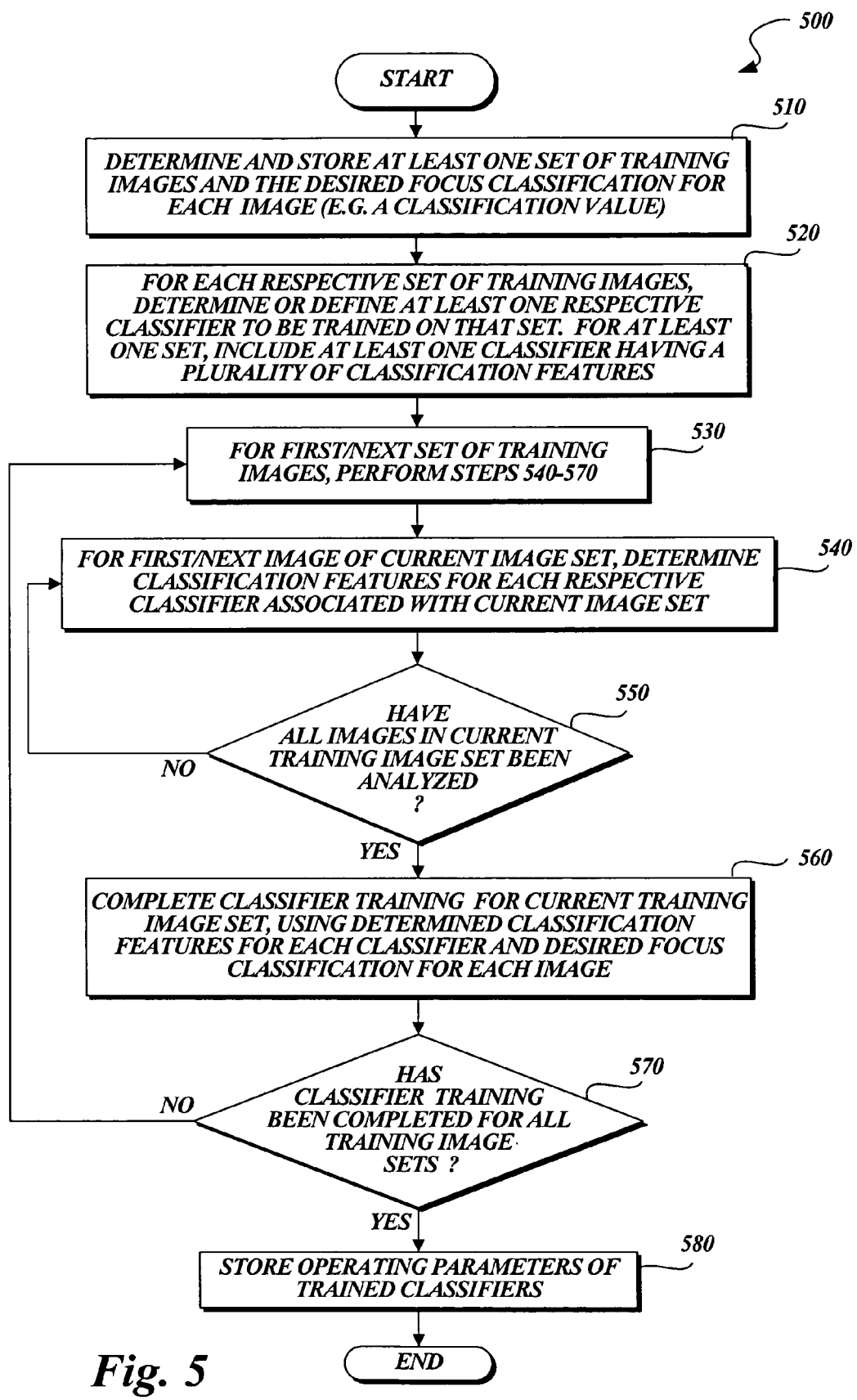
FIG. 5 is a flow diagram illustrative of one embodiment of a routine for training one or more classifiers for a focus assessment method in accordance with the present invention.

FIG. 5 is a flow diagram illustrative of one embodiment of a routine 500 for training one or more classifiers for a focus assessment method in accordance with the present invention. At a block 510, at least one set of training images, which should include both focused and defocused images, are input along with the expected classification values for each image. For example, an expert may manually review each image and enter a classification value that is indicative of whether each image is in or out of focus. In one embodiment, an image that is in focus is assigned a classification value of 0, while a slightly out of focus image is assigned a classification value of 1, and a significantly out of focus image is assigned a classification value of 2. These assigned classification values then become the desired classifier (e.g. neural network) outcomes or outputs to be learned. More than one set of training images may be desirable when the image assessment method includes more than one classifier, as described in greater detail below.

At a block 520, at least one respective classifier is defined or chosen to be trained for each respective set of training images. At least one respective classifier used by the focus assessment method should be based on a plurality of focus classification features. As one example, the previously described routine 400 may be used to determine the plurality of features. Operation continues at a block 530, where the operations of blocks 540-570 are performed for the first/next set of training images. At a block 540, for the first/next image of the current training image set, the focus classification features are determined for that image, for each respective classifier associated with the current training image set. Next, at a decision block 550, it is determined whether all images in the current set if training images have been analyzed. If all images have been analyzed, operation continues at a block 560, otherwise the routine returns to the operations of block 540. At the block 560, each respective classifier associated with the current set of training images is trained based on its associated focus classification features determined at block 520 for each training image, along with the desired focus classifications for each training image provided at block 510.

In general, training can be accomplished for a neural net type classifier by repeatedly iterating through all of the training images (each respective training image being represented by its respective classification feature vector) and their assigned focus classifications; or for a k-NNR classifier, by incorporating the training set data entries in the classifier, or for a decision-tree type classifier by performing other data analysis/extraction/transformation on the training data in order to obtain sufficiently generalized decision rules for the image focus assessment. In other words, the purpose of the training phase is for the classifier to effectively "learn" or "discover" the relationships between the extracted classification features and the assigned or desired image focus classification states, and to generalize these relationships for application during a later classification phase, when new images will be input and assessed. More generally, various training methods and algorithms for various types of classifiers are available in the related literature, as known to one skilled in the art, and any applicable now-known or later-developed training method or algorithm may be used.

At a decision block 570, it is determined whether classifier training has been completed for all the training image sets. If not, the routine 500 returns to the operations of the block 530. Otherwise, operation continues at a block 580, where the respective operating parameters (e.g., the weighting coefficients, training-data feature vectors, or the like) associated with each respective trained classifier are stored for later use, and the routine ends. It should be appreciated that the order of operations shown and described above with reference to FIG. 5 are exemplary only, and not limiting. Various other orders and/or combinations of such operations may be used, as will be apparent to one skilled in the art based on the information disclosed herein.

In various embodiments, a focus assessment method according to this invention may use a single multi-feature classifier and a single set of training images. In various other focus assessment method embodiments according to this invention, a now-known or later-developed type of multi-classifier "ensemble" or "ensemble learning" classification method (also known as "synergistic classification" or "multiple cooperating classifiers") may be used. It is known that in various applications of classification, the results of an ensemble of "independent" classifiers can sometimes be combined to increase the accuracy and/or robustness of classification, compared to the performance generally provided by a single one of the classifiers. In the present case, independent classifiers can generally be provided by using qualitatively different classifiers, or by training similar or qualitatively different classifiers using independent sets of training images ("data partitioning"), or by training similar or qualitatively different classifiers using different (sub)sets of extracted image features ("feature partitioning"), or both. For example, different sets of training images may be provided as randomly selected subsets of a master set of training images, or they may be sets of images derived from qualitatively different types of workpieces or workpiece features. In either case, even for similar classifiers, a different training result (that is, a quantitatively different classifier) may be obtained in relation to each different set of training images, and the classifiers of the same type, but having different training results (e.g. different sets of trained weights for neural net classifiers) may be used as members of a multi-classifier focus assessment method according to this invention. Of course, qualitatively different types of classifiers, trained on similar or dissimilar sets of training images, may also be used as members of a multi-classifier focus assessment method according to this invention.

As previously described in this respect to the block 370 of the routine 300 shown in FIG. 3, the outcomes of a plurality of classifiers may be combined to determine a final "multi-classifier" outcome for an image to be assessed according to this invention. As one example, each classifier outcome may be a value that is numerically combined with the other classifier outcomes, to arrive at a multi-classifier numerical value that is indicative of an in-focus or out-of-focus image, depending on its value. As a second example, each individual classifier outcome may be converted to a "vote" that the image is either in-focus or out-of-focus, and the multi-classifier outcome may be determined as the focus state having the most votes. As a further example, the votes may be weighted by coefficients proportional to the classification performance of each classifier on a training set or test set of images. However, these methods of determining a multi-classifier outcome are exemplary only, and not limiting. More generally, any applicable now-known or later-developed method or output combination strategy for determining a multi-classifier outcome may be used. Various aspects of ensemble learning and classification methods are discussed in US Patent Application Publication no. 2003/0033436 A1, published Feb. 13, 2003, which is incorporated herein by reference, in its entirety. In addition, ensemble learning and classification methods are discussed in "Attribute bagging: improving accuracy of classifier ensembles by using random feature subsets", by Robert Bryll, et al. in *Pattern Recognition* 36 (2003), pages 1291-1302, which is incorporated herein by reference for its representation of various aspects of the state-of-the-art regarding the use of ensemble learning and classification.

Figure 6:
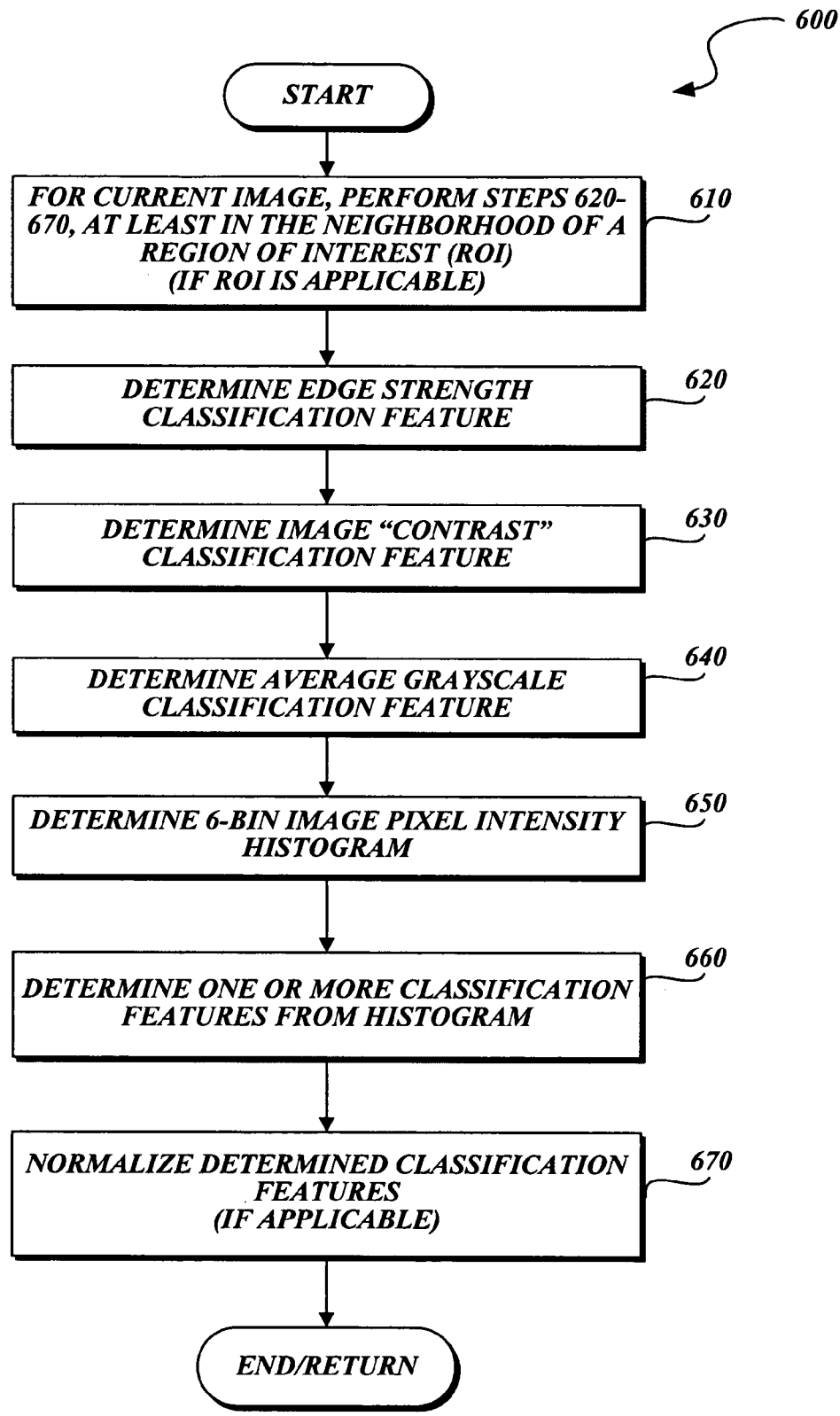
FIG. 6 is a flow diagram illustrative of a second exemplary embodiment of a routine for determining focus classification features for a multi-parameter classifier in accordance with the present invention.

FIG. 6 is a flow diagram illustrative of a routine 600, that is a second exemplary embodiment of a routine for determining focus classification features for a multi-parameter classifier in accordance with the present invention. Operation begins at a block 610, where the operations of blocks 620-670 are performed for a current image, at least in the neighborhood of a region of interest. At a block 620, at least one edge strength focus classification feature is determined. At a block 630, at least one focus classification feature related to "contrast" or contrast-range, or the like, is determined. At a block 640, an average grayscale focus classification feature is determined. At a block 650, a six-bin image pixel intensity histogram is determined for at least the neighborhood of the region of interest. Next at a block 660, one or more pixel intensity distribution parameters (e.g., a histogram bin ratio) are determined based on the pixel intensity histogram determined at the block 650. At a block 670, if the native value of one or more of the previously determined focus classification features is not suitable in comparison to the native values of the other classification features determined in the routine 600, then such classification features are normalized so as to avoid distortion or biasing of the desired operation of the related classifier (e.g. a neural network) by classification features with idiosyncratically large or small numerical values, and the routine 600 ends. The various types of focus classification features determined in the routine 600 have been generally described above, with reference to the routine 400 shown in FIG. 4, therefore additional description is not required here.

It will be appreciated that the method of the present invention may be utilized to detect when an image is out of focus (or conversely, sufficiently focused), as opposed to what may be a more complex task of attempting to determine whether an image is optimally focused. In other words, rather than requiring analysis to determine the best focus, the method of the present invention may be more simply used as an "out of focus detector," which indicates whether an image is in or out of an acceptable range of focus for further processing or inspection. As previously mentioned, if the image is already sufficiently focused, the running of a time consuming autofocus routine can be avoided.

It will also be appreciated that the classifier (e.g., a neural network) may be customized to particular types of images so as to improve the classification performance. For example, a "generic" classifier may be trained to provide reasonably accurate focus assessments for a large variety of typical workpieces in standard lighting conditions, while a more specialized classifier may be trained to classify certain types of workpieces in specific illumination conditions. Furthermore, the performance of one or more focus classifiers may be further customized by biasing the expert-classified set(s) of training images, for example by classifying even the slightly defocused images of the training set as being significantly out of focus, or by accepting slightly defocused images as being still in focus, depending on the desired training bias that is to be introduced. This way the classifier training will result in a "more strict" or "less strict" image focus classifier, depending on the particular desire of the user in a particular application. Therefore, the focus assessment can be tailored to the particular application, if desired.

Figure 7:
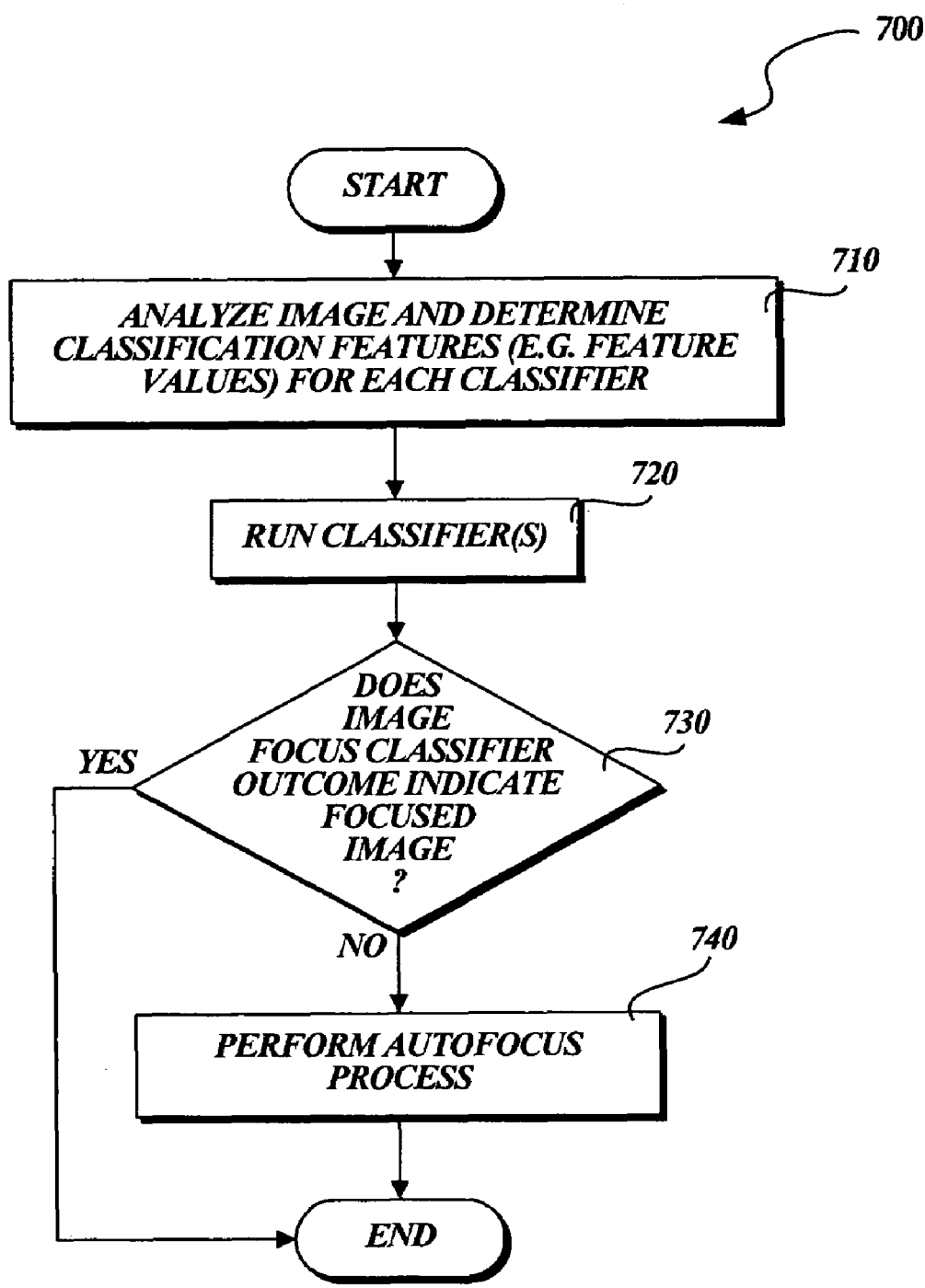
FIG. 7 is a flow diagram illustrative of one embodiment of a routine for determining if an image is in focus and performing an autofocus process.

FIG. 7 is a flow diagram illustrative of one embodiment of a routine 700 for determining if an image is out of focus and, if so, performing an autofocus process. At a block 710, the image is analyzed and values are determined for the applicable focus classification features. At a block 720, one or more applicable classifiers are run. At a decision block 730, a determination is made as to whether the image focus classifier(s) outcome indicates a focused image. If the image focus classifier outcome indicates a focused image, then the routine ends. Otherwise, if the image focus classifier outcome indicates that the image is not adequately focused, then the routine continues to a block 740, where an autofocus process is performed. As described above, one of the advantages of the present invention is that it saves overall processing or inspection time by avoiding the running of the relatively slow mechanical autofocus process if the image is already in focus.

Figure 8:
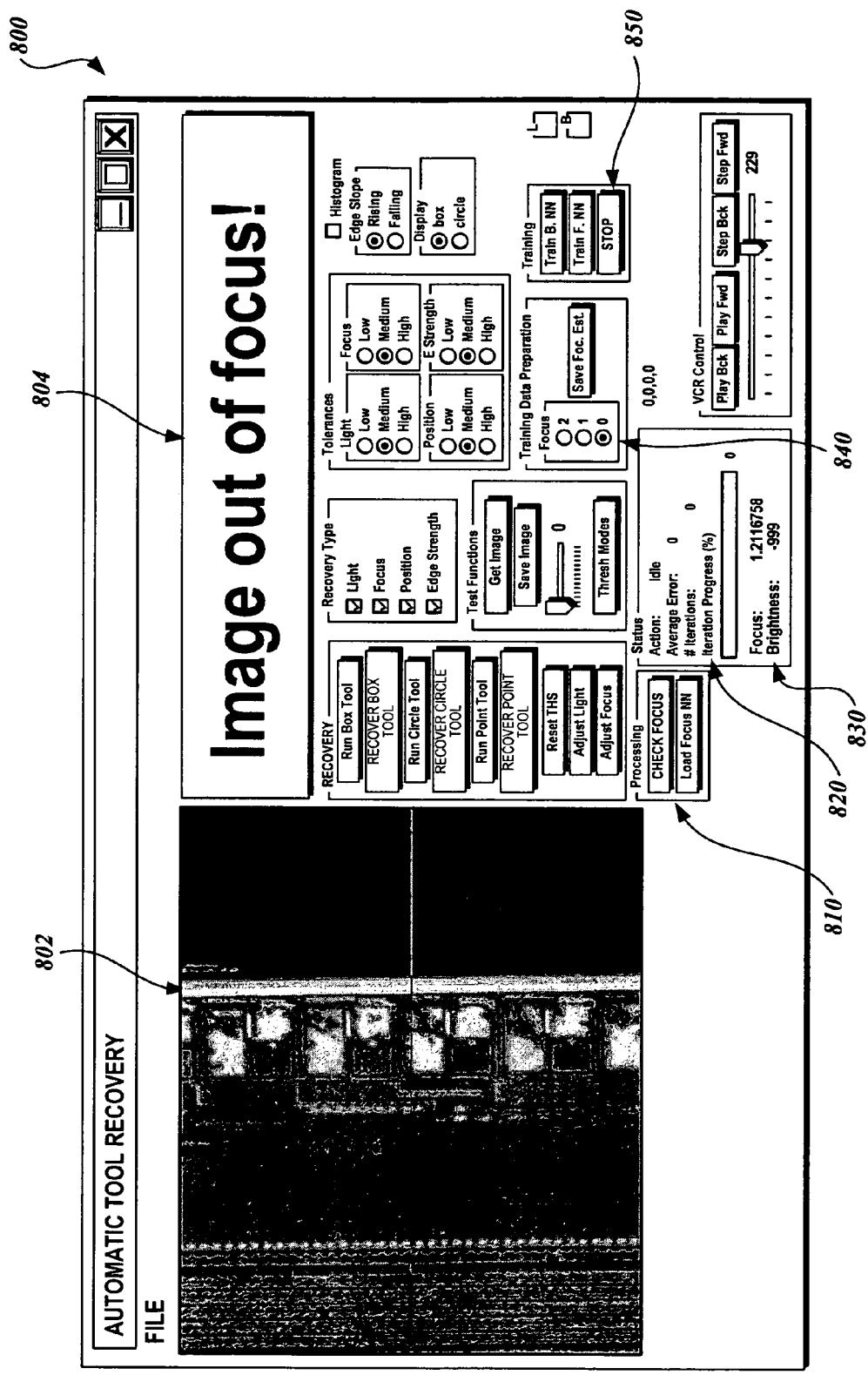
FIG. 8 is a screen shot illustrating one example of an out of focus image and a user interface usable to input and label training images, train focus classifier(s), run focus classifier(s), and display assessed images and their classification.

FIG. 8 is a sample screen shot 800 illustrating one example of an out of focus image and a user interface usable to input and label training images, train focus classifier(s), run focus classifier(s), and display assessed images and their classification.

The screen shot 800 includes a display area 802 that shows an out of focus image, and a display area 804, which includes the text "image out of focus!" A display area 810 includes buttons, or other operable control widgets, for "check focus" and for "load focus neural network." The "load focus neural network" operates to load a neural network pattern classifier, or more generally, a classifier of any type used by the applicable focus assessment method, as described above. The button for "check focus" runs the applicable focus assessment method on a current image.

At a display area 820, various indications are provided regarding the status of the current "action," "average error," "number of iterations," and "iteration progress." These elements generally provide the status of the training of a neural network classifier, or the like. The "average error" is an indication of a representative difference between the assigned or desired classification values for the training set of images and the values being produced by the current state of the current classifier for the training set. As will be described in more detail below, when the average error has reached a low enough value, it is desirable to stop the training so as to avoid over-fitting the neural network classifier, or the like, to the set of training images.

For the display area 830, in an example where images are provided with classifications values of 0=in focus, 1=somewhat out of focus, and 2=significantly out of focus, the "focus" value in display area 830 provides a value within the range of 0-2 for the current image. For example, the displayed focus value of 1.216758 indicates that the current image is relatively out of focus, corresponding to the current image in the image display area 802. In one embodiment, a threshold value is selected (e.g., 0.5, for classification values in the range of 0-2, as described above) for determining when an image is in focus. However, more generally, a numerical outcome value of the classifier can be compared to a single threshold and interpreted as "in focus" or "out of focus", or compared to a plurality of thresholds and interpreted to fall within three or more classifications, e.g., "in focus", "slightly out of focus", "significantly out of focus" etc., in various embodiments or applications.

A display area 840 is provided for a user to manually enter a respective desired focus assessment value (e.g. 0, 1 or 2) for each respective image, when inputting a set of training images during a training phase of operation. In a display area 850, a button "Train F NN" (for focus training) is provided for initiating or continuing training of a current classifier (e.g., neural network). This is utilized after all the data has been entered for the training images. During the training process, once the average error of the display area 820 is indicated to be low enough or a desired number of training iterations is reached, then the "stop" button, or other operable control widget, may be manually selected or automatically activated, to terminate training, for example, to prevent over-fitting the current classifier to the current set training images.

Figure 9:
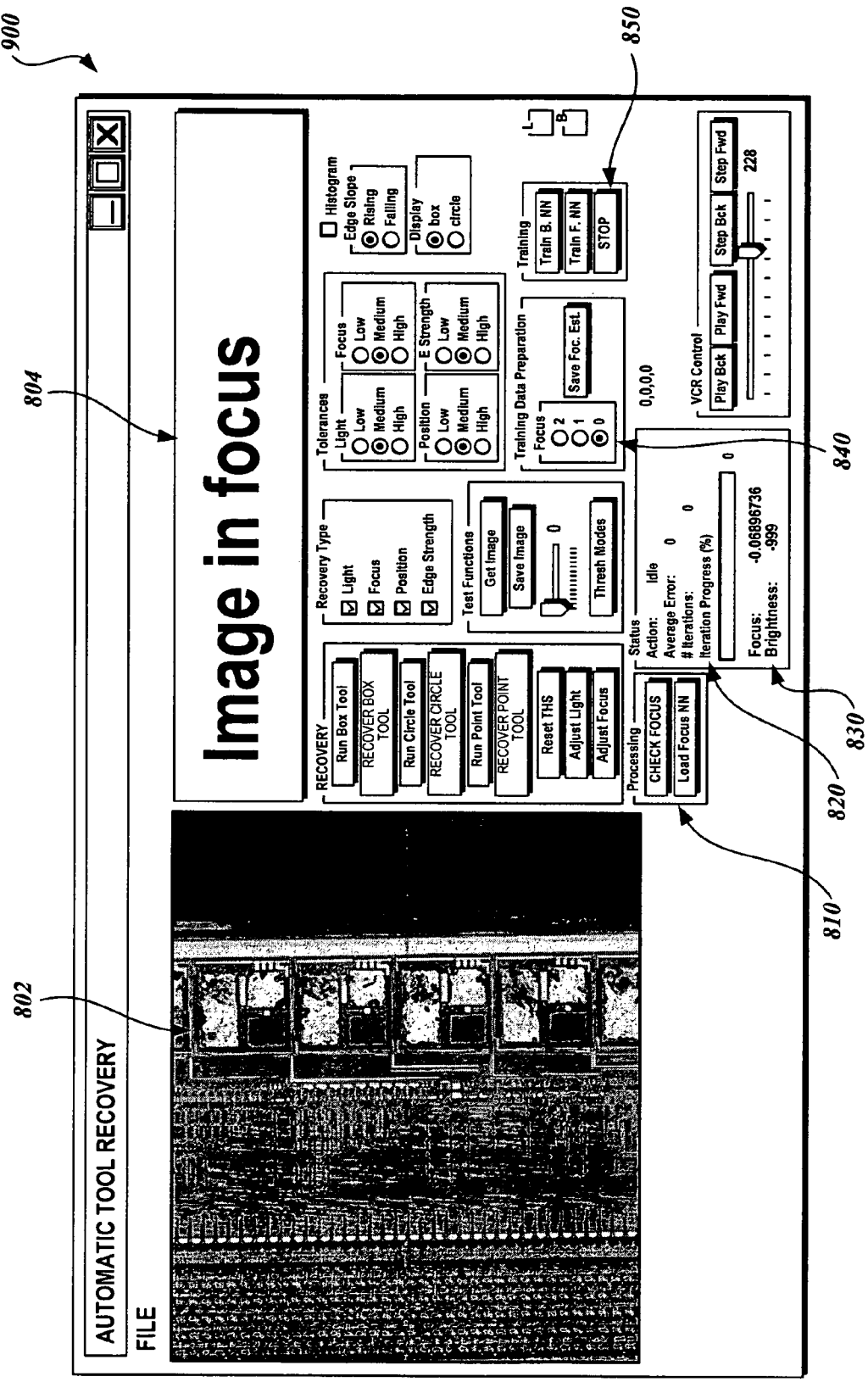
FIG. 9 is a screen shot of the user interface of FIG. 8, wherein the assessed image is in focus.

FIG. 9 is a sample screen shot 900 of the user interface of FIG. 8, wherein the assessed image is in focus. As shown in FIG. 9, in the display area 802 an in-focus image is illustrated. In a display area 804, the text indicates "image in focus." In the display area 830, the focus classification value is shown to be −0.06896736, which is near zero and thus indicates that the image is in focus. As previously discussed, in one embodiment, a value of 0.5 is selected as the threshold for classifying an image has in focus. Negative values are possible for a focus classification value outcome since the various focus classification features that are determined for the images in the training phase may have smaller or greater values than the new images that are assessed by the classifier once its operating parameters have already a been established, thus potentially resulting in focus assessment classification values outside of the 0 to 2 range that are manually provided during the training phase of the classifier. Stated another way, since the classification outcome values output by a trained neural network, or the like, are unrestricted, the trained network weights can produce values outside the nominally expected range when used to process input images having characteristics not present in the training set. However, if the output value is negative but reasonably close to zero, the image can be safely assessed as "in focus".

While various embodiments of the invention have been illustrated and described with reference to grayscale images, it should be appreciated that the invention is similarly applicable to color images. As one example, it is well known that a grayscale image may be derived from a color image by combining its color channels according to formulas which depend on the color space used (e.g., for a red-green-blue color space, a weighted sum of the three color channel intensities for adjacent color pixels may be used to derive a usable grayscale pixel value for that nominal pixel location). Such a derived grayscale image may then be processed according to a focus assessment method described above to assess the focus of the original color image. Alternatively, the various embodiments described above may be modified in a straightforward manner to operate directly on color image data, if desired. For example, color parameters indicative of the amount of chromatic aberration in the image (which is closely related to image focus) may be used as focus classification features.

In addition, it will be appreciated that various other changes, including, but not restricted to, changes to or rearrangements of the sequence and/or combination of operations and the like, can be made to the previously described systems and methods and the desired focus assessment results may still be obtained. Thus, while the preferred embodiment of the invention has been illustrated and described for various applications, it will be appreciated that various changes can be made therein without departing from the spirit and scope of the invention.

The embodiments of the invention in which an exclusive property or privilege is claimed are defined as follows:

1. A focus assessment method for determining a focus classification for a workpiece feature image, the focus classification usable to determine whether the image is sufficiently focused, such that a machine vision inspection system may perform useful machine vision inspection operations on the workpiece feature image, the method comprising:
   using the machine vision inspection system to perform the steps comprising:
   (a) acquiring a first image of a workpiece feature for which an image focus classification is to be determined;
   (b) determining a plurality of focus classification features based on the first image, the focus classification features being abstract features included in a multi-parameter feature vector; and
   (c) determining the focus classification based on processing the determined plurality of focus classification features using at least one classifier, wherein:
      the at least one classifier comprises at least a first respective classifier that operates on a first respective plurality of classification features;
      the focus assessment method does not require the acquisition of an additional image of the workpiece feature that is differently focused than the first image;
      at least the first respective classifier is trained on at least a first respective set of training images;
      the set of training images comprises respective images of a plurality of different workpieces, wherein the respective images include in-focus images and out-of-focus images; and
      the respective images are assigned a respective desired focus classification prior to training the respective classifier.

2. The method of claim 1, wherein the at least one classifier comprises at least one classifier selected from a group of classifier types comprising a neural network classifier, a k-nearest neighbor rule classifier (k-NNR), a decision tree classifier, a Bayesian classifier, and a fuzzy logic classifier.

3. The method of claim 1, wherein the at least one classifier comprises a plurality of respective classifiers, the plurality of respective classifiers including the first respective classifier that operates on the first respective plurality of classification features.

4. The method of claim 3, wherein the plurality of respective classifiers includes at least two respective classifiers that operate on respective pluralities of classification features.

5. The method of claim 3, wherein:
   each of the respective plurality of classifiers operates on at least one respective focus classification feature to determine a respective classifier outcome;
   the respective classifier outcomes are combined to determine a multi-classifier outcome; and
   the step of determining the focus classification comprises basing the focus classification on the multi-classifier outcome.

6. The method of claim 1, wherein the plurality of focus classification features comprises at least one edge strength type of focus classification feature.

7. The method of claim 6, wherein the at least one edge strength type of focus classification feature comprises an operation that suppresses the contribution of local edge strength values that do not reach a predetermined threshold value.

8. The method of claim 1, wherein the plurality of focus classification features comprises at least one focus classification feature that is insensitive to the spatial distribution of the pixel intensity variations in the image.

9. The method of claim 8, wherein the focus classification feature that is insensitive to the spatial distribution associated with the pixel intensity variations in the image is selected from a group of focus classification features that are image pixel intensity statistical distribution parameters.

10. The method of claim 9, wherein the group of focus classification features that are image pixel intensity statistical distribution parameters comprises a grayscale intensity variance, an intensity variance derived from converted color channel information, an average grayscale intensity, and an average intensity derived from converted color channel information.

11. The method of claim 8, the method further comprising determining the number of pixels included in at least some of the bins of an image pixel intensity histogram, wherein the focus classification feature that is insensitive to the spatial distribution associated with the pixel intensity variations in the image is determined based on the image pixel intensity histogram.

12. The method of claim 11, wherein the image pixel intensity histogram has at least 4 bins and at most 12 bins.

13. A machine vision inspection system comprising:
   (a) a vision system components portion; and
   (b) a control system portion comprising:
      (i) an image focus assessment portion comprising an image focus classification portion and a classifier training portion;
      (ii) a display device; and
      (iii) a graphical user interface that can be displayed on the display device, the graphical user interface including at least one display area including control widgets operable to control operations of the classifier training portion, wherein the image focus assessment portion includes a routine operable for performing a single-image focus assessment method comprising:
         determining a plurality of focus classification features based on a first image of a workpiece feature, the focus classification features being abstract features included in a multi-parameter feature vector, and determining a focus classification for the first image based on processing the determined plurality of focus classification features using at least one classifier, wherein the at least one classifier comprises at least a first respective classifier that operates on a first respective plurality of classification features and the focus assessment method does not require the acquisition of an additional image of the workpiece feature that is differently focused than the first image;

wherein the at least one display area including control widgets operable to control operations of the classifier training portion comprises a plurality of areas selected from a group comprising: a display area for displaying training images, a display area operable for inputting a desired focus classification for a training image, a display area operable for activating training operations for a current classifier based on a current set of respective training images and their respective desired focus classifications, a display area operable for discontinuing training iterations for a current classifier, a display area for displaying a value indicative of a classification error rate of a current classifier during its training, the error rate based on the respective focus classifications of the respective training images by the current classifier in comparison to the respective desired focus classifications for the respective training images, and a display area for displaying a focus classification outcome value produced by a current classifier for a current training image; and wherein the display area operable for inputting a desired focus classification for a training image is operable to input at least three levels of focus classification, the at least three levels of focus classification including a first classification level corresponding to the best in-focus classification that can be entered, a second classification level corresponding to the worst out-of-focus classification that can be entered, and at least one additional classification level between the best in-focus classification and the worst out-of-focus classification.

14. The machine vision inspection system of claim 13, wherein inputting a respective level of focus classification corresponds to inputting a respective numerical value indicative of the focus classification.

15. The machine vision inspection system of claim 14, wherein, in the routine operable for performing a single-image focus assessment method, the step of determining a focus classification for the first image based on processing the determined plurality of focus classification features using at least one classifier comprises:

determining a focus classification outcome value that can potentially vary over a continuous range of numerical values; and comparing the determined focus classification outcome value to at least one numerical limit in order to determine the focus classification for the first image.

16. A recording medium that stores a control program, the control program executable on a computing device usable to receive data corresponding to images workpiece features for which an image focus classification is to be determined, the control program including instructions for performing a single-image focus assessment method, the single-image focus assessment method instructions comprising:

instructions for determining a plurality of focus classification features based on a first image of a workpiece feature for which an image focus classification is to be determined, the focus classification features being abstract features included in a multi-parameter feature vector; and instructions for determining a focus classification based on processing the determined plurality of focus classification features using at least one classifier, wherein:
the at least one classifier comprises at least a first respective classifier that operates on a first respective plurality of classification features;

the focus assessment method instructions do not require the acquisition of an additional image of the workpiece feature that is differently focused than the first image;

at least the first respective classifier is trained on at least a first respective set of training images;

the set of training images comprises respective images of a plurality of different workpieces, wherein the respective images include in-focus images and out-of-focus images; and the respective images are assigned a respective desired focus classification prior to training the respective classifier.

17. A focus assessment method for determining a focus classification for a workpiece feature image, the focus classification usable to determine whether the image is sufficiently focused, such that a machine vision inspection system may perform useful machine vision inspection operations on the workpiece feature image, the method comprising:

using the machine vision inspection system to perform the steps comprising:
(a) acquiring a first image of a workpiece feature for which an image focus classification is to be determined;
(b) determining a plurality of focus classification features based on the first image, the focus classification features being abstract features included in a multi-parameter feature vector; and
(c) determining the focus classification based on processing the determined plurality of focus classification features using at least one classifier, wherein:
the at least one classifier comprises a plurality of respective classifiers, the plurality of respective classifiers including at least a first respective classifier that operates on a first respective plurality of classification features;
the focus assessment method does not require the acquisition of an additional image of the workpiece feature that is differently focused than the first image;
each of the respective plurality of classifiers operates on at least one respective focus classification feature to determine a respective classifier outcome;
the respective classifier outcomes are combined to determine a multi-classifier outcome; and
the step of determining the focus classification comprises basing the focus classification on the multi-classifier outcome.

* * * * *

UNITED STATES PATENT AND TRADEMARK OFFICE
CERTIFICATE OF CORRECTION

PATENT NO. : 7,668,388 B2  Page 1 of 1
APPLICATION NO. : 11/072360
DATED : February 23, 2010
INVENTOR(S) : Robert K. Bryll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1329 days.

Signed and Sealed this

Seventh Day of December, 2010

David J. Kappos
*Director of the United States Patent and Trademark Office*